(12) United States Patent
Ribarich

(10) Patent No.: US 7,633,230 B2
(45) Date of Patent: *Dec. 15, 2009

(54) DIMMABLE FLUORESCENT LAMP PACKAGE

(75) Inventor: Thomas J Ribarich, Laguna Beach, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/787,984

(22) Filed: Apr. 18, 2007

(65) Prior Publication Data

US 2007/0188103 A1    Aug. 16, 2007

Related U.S. Application Data

(60) Division of application No. 11/139,161, filed on May 27, 2005, now Pat. No. 7,224,125, which is a continuation-in-part of application No. 10/678,004, filed on Oct. 2, 2003.

(60) Provisional application No. 60/416,350, filed on Oct. 4, 2002.

(51) Int. Cl.
  *H01J 7/44* (2006.01)
  *H05B 37/02* (2006.01)
(52) U.S. Cl. .................. 315/51; 315/308; 315/DIG. 4
(58) Field of Classification Search ................. 315/51, 315/56, 291, 307, 308, DIG. 4; 445/23, 26, 445/66
See application file for complete search history.

(56) References Cited

U.S. PATENT DOCUMENTS

| | | | |
|---|---|---|---|
| 4,197,485 A | 4/1980 | Nuver | 315/291 |
| 4,371,812 A | 2/1983 | Widmayer | 315/291 |
| 4,394,603 A | 7/1983 | Widmayer | 315/311 |
| 4,464,606 A | 8/1984 | Kane | 315/158 |
| 4,482,844 A | 11/1984 | Schweer et al. | 315/194 |
| 4,496,878 A * | 1/1985 | Nilssen | 315/73 |
| 4,644,226 A | 2/1987 | Vernooij et al. | |

(Continued)

FOREIGN PATENT DOCUMENTS

EP    0 564 424 A2    10/1993

(Continued)

OTHER PUBLICATIONS

IAEEL Newsletter Jan. 1998—New Ballast May Start CFL Revolution, Nils Borg, pp. 1-2.

(Continued)

*Primary Examiner*—Douglas W Owens
*Assistant Examiner*—Jimmy T Vu
(74) *Attorney, Agent, or Firm*—Farjami & Farjami LLP

(57) ABSTRACT

A lamp package includes a base for insertion into an electrical socket, a complete dimmable ballast circuit contained within and electrically connected to the base, and a fluorescent lamp, including a CFLP, connected to and dimmed through the ballast circuit. The base includes a thermally conductive body, such as an epoxy, so that the base dissipates heat from the ballast. The package also includes a diffuser, possibly connected directly to the base, that surrounds the lamp. In a further aspect of the invention, the lamp package includes one or more of a variety of sensors, such as a photodetector, that are connected to the dimmable ballast circuit, thereby providing a self-dimming lamp. The self-dimming lamp is suitable for use in a standard Edison socket and with CFLPs to provide a self-regulated light output. Various lighting schemes may be incorporated into the dimmable ballast circuit, such as regulated light output applications.

11 Claims, 5 Drawing Sheets

U.S. PATENT DOCUMENTS

| | | | |
|---|---|---|---|
| 4,739,222 A | 4/1988 | Nomoto et al. | |
| 4,857,806 A | 8/1989 | Nilssen | |
| 4,961,027 A | 10/1990 | Muessli | 315/58 |
| 5,030,890 A | 7/1991 | Johnson | |
| 5,049,785 A | 9/1991 | Shaffer | |
| 5,128,590 A | 7/1992 | Holzer | |
| 5,164,635 A | 11/1992 | De Jong et al. | 315/58 |
| 5,294,865 A | 3/1994 | Haraden | |
| 5,485,057 A | 1/1996 | Smallwood et al. | |
| 5,498,931 A | 3/1996 | Bedocs | 315/158 |
| 5,504,394 A | 4/1996 | Johnson | |
| 5,545,950 A | 8/1996 | Cho | 315/56 |
| 5,581,158 A | 12/1996 | Quazi | 315/149 |
| 5,596,247 A * | 1/1997 | Martich et al. | 315/56 |
| 5,653,527 A | 8/1997 | Muessli | |
| 5,691,603 A | 11/1997 | Nilssen | |
| 5,703,440 A | 12/1997 | Kachmarik et al. | |
| 5,744,913 A | 4/1998 | Martich et al. | |
| 5,952,792 A | 9/1999 | Borowiec et al. | |
| 5,955,841 A | 9/1999 | Moisin et al. | 315/56 |
| 5,961,204 A * | 10/1999 | Martich et al. | 362/295 |
| 5,971,564 A | 10/1999 | Wang | 362/263 |
| 6,037,721 A | 3/2000 | Lansing et al. | 315/295 |
| 6,064,155 A * | 5/2000 | Maya et al. | 315/56 |
| 6,091,199 A | 7/2000 | Van Pelt et al. | |
| 6,100,643 A | 8/2000 | Nilssen | |
| 6,135,620 A | 10/2000 | Marsh | 362/377 |
| 6,150,761 A | 11/2000 | Eberson et al. | 315/61 |
| 6,411,524 B1 | 6/2002 | Chen et al. | 361/803 |
| 6,437,502 B1 | 8/2002 | Nishio et al. | 313/493 |
| 6,443,769 B1 | 9/2002 | Nerone et al. | |
| 6,459,215 B1 | 10/2002 | Nerone et al. | |
| 6,492,773 B2 * | 12/2002 | Gyoten et al. | 315/56 |
| 6,494,730 B1 | 12/2002 | Yan | 439/226 |
| 6,548,948 B1 | 4/2003 | Muessli | |
| 6,577,066 B1 | 6/2003 | Kominami et al. | |
| 6,582,269 B2 | 6/2003 | Sakai et al. | 445/26 |
| 6,616,310 B1 | 9/2003 | Marsh | 362/377 |
| 6,661,185 B2 | 12/2003 | Kominami et al. | |
| 7,199,531 B2 * | 4/2007 | Loughrey | 315/294 |
| 2002/0047612 A1 | 4/2002 | Matsui et al. | |
| 2002/0067139 A1 | 6/2002 | Sabate | |
| 2003/0179577 A1 | 9/2003 | Marsh | 362/260 |

FOREIGN PATENT DOCUMENTS

| | | |
|---|---|---|
| FR | 2631739 A1 | 11/1989 |
| JP | 11-25751 | 1/1999 |
| WO | WO 96/13048 | 5/1996 |
| WO | WO 96/10897 | 11/1996 |
| WO | WO 00/22651 | 4/2000 |

OTHER PUBLICATIONS

Patent Abstracts of Japan, Abstract JP9293597, Kishimoto Yoshio, Matsushita Electron Corp., Nov. 11, 1997.

* cited by examiner

DIMMABLE FLUORESCENT LAMP PACKAGE

RELATED APPLICATION

This application is a division of U.S. patent application Ser. No. 11/139,161, filed May 27, 2005 entitled Dimmable Fluorescent Lamp Pack which is a continuation-in-part of and claims priority to U.S. patent application Ser. No. 10/678,004, filed on Oct. 2, 2003, entitled COMPACT FLUORESCENT LAMP PACKAGE, by Thomas J. Ribarich, which is based on and claims priority to U.S. Provisional Application No. 60/416,350, filed on Oct. 4, 2002, entitled COMPACT FLUORESCENT LAMP MULTI-CHIP MODULE SCREWBASE BALLAST, the contents of which are herein incorporated by reference.

BACKGROUND OF THE INVENTION

1. Field of the Invention

The present invention relates generally to a self contained lamp control and lamp package, and relates more specifically to a self contained lamp for automatic light level adjustment.

2. Description of Related Art

Referring to FIG. 1, a conventional incandescent light bulb 5 includes base 10, and evacuated envelope or diffuser 14. Diffuser 14, which is typically pear-shaped, surrounds a filament (not shown) that is electrically connected to base 10 for electrical connection to a conventional lamp socket. A well-known base is an Edison screw-base, as shown, which is electrically connectable to an Edison screw socket.

In recent years, compact fluorescent lamp packages have been introduced into the market. These lamp packages are particularly desirable because of their energy efficiency.

Referring to FIG. 2A, an example prior art compact fluorescent lamp package (CFLP) 7 is shown consisting of fluorescent lamp 12, lamp holder 13, and auxiliary housing 15 for interfacing between lamp holder 13 and base 10. Typically, housing 15 also houses a complete ballast 17. However, it should be noted that ballast 17 has also been placed into base 10, while either retaining housing 15 or removing this housing. In most CFLPs an Edison screw-base is used as base 10 for a reliable mechanical and electrical connection to a standard Edison socket, although other sockets are known and used.

The typical height of a standard incandescent light bulb 5 is about 4.5 in. However, most conventional CFLPs are typically taller than a conventional incandescent light bulb due to auxiliary elements such as auxiliary housing 15. As a result, a conventional CFLP may extend out of a lampshade or fixture adapted for an incandescent light bulb, causing an undesirable appearance, or the CFLP may not fit within an existing fixture. This extended height, together with the unusual appearance of conventional CFLPs, are believed to adversely affect the acceptance of CFLPs in the marketplace Another issue with the conventional CFLP is that when ballast 17 is housed in auxiliary housing 15, the heat generated by ballast 17 cannot escape very efficiently. Referring, for example, to FIG. 2B, in a typical enclosure or downlight fixture 19, the heat generated from the lamp and ballast of a conventional CFLP 7 collects up in the fixture around the CFLP 7 without any path to escape.

As a result, there is a higher ambient temperature around CFLP 7 which causes the internal components of the CFLP 7, especially ballast 17, to run at even higher temperatures, e.g., above 150° C. The increase in the internal heat decreases reliability, causes field failures and limits the use of a conventional CFLP to open rather than enclosed fixtures, all of which further adversely affects the desirability of CFLPs. Nonetheless, it should be noted that when ballast 17 has been placed into base 10 as described above, the base has acted as a heat sink for the ballast, helping to dissipate some of this heat.

A further issue with the conventional CFLP is that because of its size and operational constraints, such as its high ambient temperature and its use of the conventional Edison socket, it is difficult to realize some desirable features, such as, for example, a dimming feature where the light output of the fluorescent lamp is selected based on a control signal or setting. More specifically, conventional incandescent lights typically use a dimmer control mounted on a wall near an on/off switch for adjusting the light level. These types of dimming controls operate on various principles but all in essence change the characteristic of the electrical power supplied to the light fixture to create various power levels supplied to the lamp, thereby affecting the output lighting level. However, these types of dimming controls are unsuitable for CFLPs because the change in power may extinguish the lamp. As a result, in order to incorporate a dimming feature into the CFLP, a dimmable ballast circuit is typically used where the electronic ballast now includes an additional dimming function that controls the ballast to dim the lamp. However, a mechanism is now needed to control this additional dimming function, thereby making it a difficult challenge to provide a dimming feature to a CFLP.

For example, one mechanism that has been used to control a dimmable ballast circuit is to dedicate a wire from a wall-mounted dimmer to the fixture. However, if the CFLP is inserted into an Edison socket, this requires additional wiring. Specifically, Edison screw sockets typically only provide switched utility power on two wires, a line input and a neutral wire. Accordingly, a third wire is now needed to control the dimming function. However, providing a third wire or connection to the Edison screw socket is a highly undesirable additional requirement to realize a dimming feature.

Another example mechanism that has been used to control a dimmable ballast circuit is to send control signals from a switch to the fixture directly over the power lines, thereby negating the need for an additional wire. However, this approach is complex, expensive, and space consuming given that the fixture must now include an interface to receive and decode the signal. Nonetheless, it should be noted that some systems that have used this mechanism have also incorporated advantageous features, including the use of an external control module that allows for the remote and automatic control of the lights. For example, a control system may be provided that can control a number of different areas of lighting to automatically change lighting settings depending upon various circumstances, such as evening hours, weekend hours, lengthened days and so forth. However, it should also be noted that these types of lighting systems typically have limited local intelligence (e.g., the fixtures lack sensor feedback that permits localized control) and often control blocks of lights together, rather than individual lights.

Another mechanism that has been used to control a dimmable ballast circuit is to include a manual control directly on the casing of the electronic ballast of the CFLP so that dimming can be effected. However, CFLPs designed to replace incandescent bulbs often do not permit easy access to the CFLP or electronic ballast by the user. In addition, once the light level has been set, it is often difficult or inconvenient to readjust.

A further mechanism that prior fluorescent light systems in general have used to control dimming is to incorporate a self-dimming function that automatically dims the light in reaction to external events. Such self-dimming functions have included the integration of a heat sensor or a photosensitive control element, such as a photocell, with the dimming function. For example, these systems have interconnected a photocell with the dimming function to automatically control the turning on/off of the light and to maintain a constant light level in a room, all based on the changing ambient light levels in the room.

In the case of the CFLP in particular, the photocell has been mounted directly on the housing 15. This arrangement creates several advantages as compared to the other dimming mechanisms described above. Specifically, this arrangement allows for individual control of each CFLP and because of the automatic feedback orientation, each CFLP is self-dimming thereby making the CFLP easier and more convenient to use because the user is not required to constantly readjust the light level as conditions change. In addition, when the CFLP is inserted into an Edison socket, the socket does not require additional wiring. This mechanism is also less complex and less expensive than prior mechanisms.

Nonetheless, prior CFLPs that have integrated a sensor, like a photocell, with the dimming function of a dimmable ballast circuit continue to have the same issues as described above with reference to the example CFLP 7. Specifically, these prior CFLPs continue to use a housing 15 to house the dimmable ballast circuit, thereby creating the same height and heat issues described above.

SUMMARY OF THE INVENTION

In accordance with an embodiment of the present invention, a fluorescent lamp package and in particular, a CFLP, includes a base, such as an Edison screw-base, for insertion into an electrical socket. A dimmable ballast circuit, which can be implemented as a single multi-chip module (MCM), is physically disposed substantially or entirely in the base of the lamp, thereby eliminating the need for an auxiliary housing for the dimmable ballast circuit. A fluorescent lamp is connected to the ballast circuit, which in turn controls the dimming of the lamp. A diffuser may also surround the lamp.

Once in the base, the ballast may be potted with a thermal epoxy, for example, to provide mechanical stability, to act as a thermal transfer, and to act as a sealant against environmental impact, such as moisture or temperatures, thereby allowing the CFLP to be used in outdoor applications. With respect to heat transfer, the lamp base serves as a heat sink with the threads of the screw-base acting as fins for allowing the heat generated by the electronic dimmable ballast to escape efficiently.

According to one aspect of the invention, the fluorescent lamp and the diffuser are mounted directly on the base, although they do not need to be. The diffuser cover can also be shaped or have an envelope approximating that of a conventional incandescent bulb. As such, when the base is a standard screw-base, a dimmable CFLP can have the appearance of a conventional incandescent light bulb thereby permitting the dimmable CFLP to serve as a replacement lamp for a standard dimmable incandescent bulb.

When implemented as a MCM, the dimmable ballast circuit of the present invention includes, for example, a control IC, power MOSFETs, bridge rectifier diodes, resistors, capacitors, and inductors all arranged, for example, on a two-sided circuit board that fits directly inside the lamp base. According to one aspect of the invention, the MCM can be manufactured in two stages, for example, with design independent components first being installed to create a general purpose type of module, and design dependent modules than being added to create a customized or application specific dimmable ballast.

Overall, a dimmable CFLP according to this embodiment of the invention has a decreased cost and size/height with a reduced component count for the ballast. The small size of the electronic ballast for the CFLP permits the overall CFLP to take on the appearance of a conventional incandescent light bulb. The heat sink capacity of the base of the CFLP permits the maximum power output of the ballast and lamp to be increased due to the attendant heat transfer efficiencies realized. Because the electronic ballast may be formed with standard and reliable manufacturing techniques, such as pick and place surface mount, the cost of the CFLP is reduced while reliability is improved.

In accordance with a further embodiment of the invention, the dimmable CFLP also includes one or more sensors that provide an indication of environmental conditions. The sensors are operatively coupled to a dimming function of the dimmable ballast circuit and provide the ballast circuit with signals for automatically driving the fluorescent lamp. In this way, a CFLP is provided with individualized feedback control and sensing to provide a self-dimming operation.

For example, the sensor may be a photodetector that is positioned on the lamp at a location where ambient light can be sensed in a room to provide a light-sense-feedback to the electronic dimmable ballast. The photodetector may be placed on the lamp base, a socket connector, the fluorescent lamp itself, or the diffuser to detect ambient light. The photodetector may be adjustable to have tolerances related to ambient light that is directly or indirectly influenced by the light of the lamp itself. Alternately, or additionally, the electronic dimmable ballast can provide functionality to compensate a photodetector feedback signal or adjust a control in the electronic ballast output to determine a scale of sensing, lamp control, or both. The electronic dimmable ballast can also compensate for the measurement of ambient light that is directly or indirectly impacted by the light emitted from the lamp under the control of the electronic ballast.

The photodetector can be very small in dimension so that it is not noticeable to the ordinary observer, and does not impact a balance of light output, as might be the case if the light output were shaded by the photodetector.

Various types of control techniques or goals may be implemented according to the invention, including maintaining a constant ambient light, maintaining hysteresis in a light level output to conserve energy or to compensate for natural light variations that may occur over the course of a given day. For example, a room lighted partially with natural light may have very different light characteristics based on sunny or cloudy days, or whether window shades or blinds are open, partially open, or closed. A room that is partially lit through natural light can experience wide variations in light levels over the course of single day, for example, from a cloudy morning to a sunny afternoon or depending upon orientation with respect to the path of travel of the sun. The lighting control according to the present invention can compensate for all these variations in light levels based either on a sensory feedback technique, or a programmed response to particular light levels, for example. As an example of a programmed response, the lamp can be programmed to respond to ambient light levels from dawn to dusk, that is, variable periods of time during which one or more programmed responses may be applied.

The sensor need not be limited to sensing light alone, but can also sense other events including room occupancy or provide motion detection for lighting or security applications.

Other features and advantages of the present invention will become apparent from the following description of the invention, which refers to the accompanying drawings.

DETAILED DESCRIPTION OF THE PREFERRED EMBODIMENTS

Figure 1:
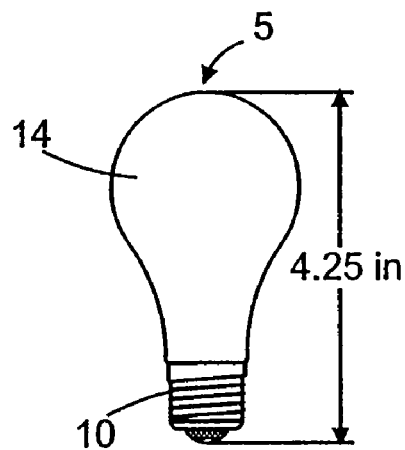
FIG. 1 shows a conventional incandescent light bulb.
Figure 2A:
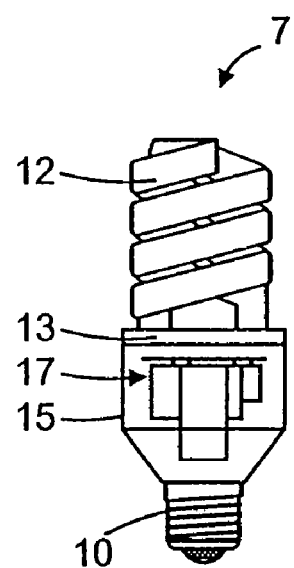
FIG. 2A shows an example conventional compact fluorescent lamp package.
Figure 2B:
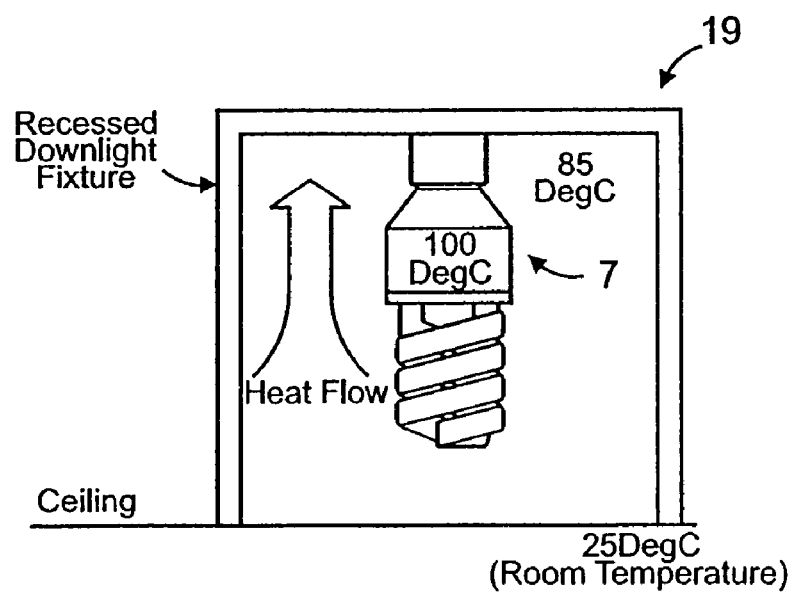
FIG. 2B shows an example conventional compact fluorescent lamp package as installed in a recessed downlight fixture.
Figure 3:
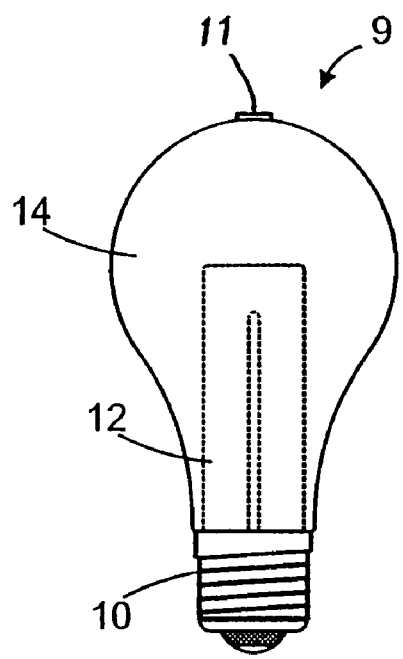
FIG. 3 shows a schematic of an example dimmable compact fluorescent lamp package according an embodiment of the present invention.

Referring to FIG. 3, there is shown an example dimmable CFLP 9 according to an embodiment of the present invention, the dimmable CFLP including a base 10, fluorescent lamp 12, and preferably diffuser 14, although the diffuser is not required. Base 10 is adapted such that it may be received in a conventional electrical socket suited for receiving an ordinary incandescent light bulb. Preferably, CFLP 9 utilizes a screw type base, such as an Edison screw-base, although other types of bases can be used. Similar to an incandescent light bulb, base 10 in CFLP 9 is used as an electrical connector to the power line.

Preferably, fluorescent lamp 12 can be of any shape or size such as, for example, U-shaped, double U-shaped, or spiral-shaped. According to one aspect of the present invention, any kind of fluorescent lamp 12 may be used with changing only a few electronic ballast components selected according to the design requirements of the lamp as discussed later.

Diffuser 14 may be of any shape, size, or color, and is made from an optically transmissive material such as glass or plastic. According to one aspect of the present invention, both the diffuser and fluorescent lamp 12 are directly connected to base 10, although they does not need to be. In accordance with a further aspect of the invention, diffuser 14 is shaped like a pear, which is a shape common to most incandescent light bulbs. As such, dimmable CFLP 9 according to the present invention can have a size and shape resembling a conventional incandescent light bulb and can be used in all applications suitable for a conventional incandescent light bulb.

According to a first embodiment of the present invention, a complete dimmable electronic ballast circuit for operating fluorescent lamp 12 is contained substantially or entirely within base 10, thereby eliminating a need for an auxiliary compartment or similar element used in prior art devices. According to a second embodiment of the invention, CFLP 9 may include a sensor 11 situated on diffuser 14, for example, and that is coupled to the dimmable electronic ballast circuit to contribute to an automatic control function.

As is well known, base 10 includes an open end leading to an interior open space. According to an aspect of the present invention, the complete dimmable ballast circuit for operating fluorescent lamp 12 can be implemented as a multi-chip module (MCM). According to the first embodiment of the present invention, the MCM is disposed substantially or entirely in the interior space of base 10, as shown by example MCM 16 of FIGS. 4 and 5.

Figure 4:
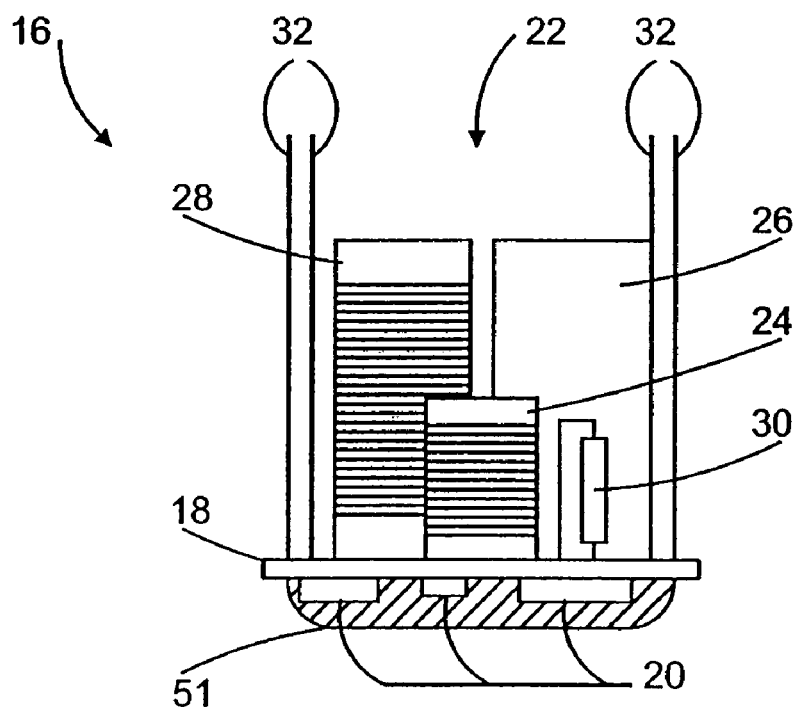
FIG. 4 schematically shows the physical appearance of an example multi-chip module implementing a dimmable ballast circuit used in a dimmable compact fluorescent lamp package according to an embodiment of the present invention.

In this example of FIG. 4, a portion of MCM 16 is located on one side of a circuit board 18 and potted with plastic molding 51. Here, components 20 are molded within plastic molding 51 to provide good protection for components 20 and good thermal transfer to draw heat away from components 20. Circuit board 18 includes connections to permit electronic devices 22 to be mounted to another side of circuit board 18 and to be in electrical contact with components 20. The electronic devices can include passive components such as a filter inductor 24, a bus capacitor 26, a resonant inductor 28, and a fuse 30. Terminals 32 are also connected to circuit board 18, and provide an electrical path to the filaments of fluorescent lamp 12. Electronic devices 22 can include other items that are active rather than passive, and can be tailored to a particular application.

In accordance with the second embodiment of the present invention, a conditioning circuit 63 (FIG. 6) can also be provided on circuit board 18 with electrical devices 22 to accept a feedback signal from a sensor 11 to contribute to controlling the dimmable electronic ballast circuit of CFLP 9 to obtain a desired output. Connections may be provided as inputs to components 20 on circuit board 18 so that fluorescent lamp 12 may be driven in accordance with a particular control technique based partially on the feedback signal.

Figure 5:
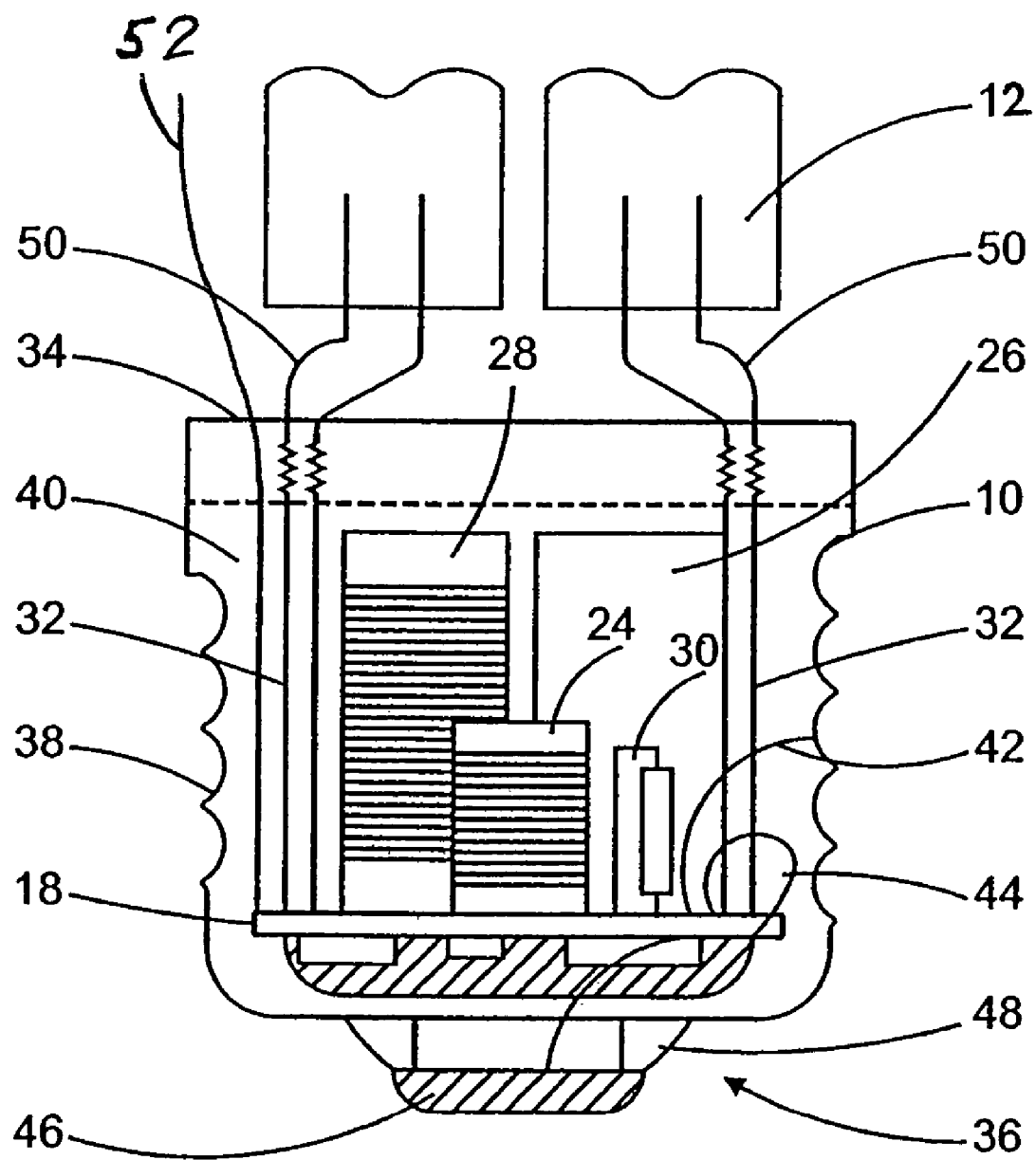
FIG. 5 shows the multi-chip module of FIG. 4 as installed in a conventional base of a conventional incandescent light bulb but employed in a dimmable compact fluorescent lamp package according to the present invention.

Referring now to FIG. 5, base 10 more specifically includes an open end 34, a closed end 36, and a wall 38 surrounding closed end 36. Wall 38 surrounds a space that substantially or entirely contains the dimmable electronic ballast circuit, such as implemented through MCM 16 as shown in FIG. 5. According to an aspect of the invention, the space enclosed by wall 38 can be filled with thermal epoxy 40, for example, to provide mechanical stability for the ballast within base 10, to act as a thermal transfer, and to act as a sealant against environmental impact, such as moisture or temperatures, thereby allowing the CFLP to be used in outdoor applications. With respect to thermal transfer, epoxy 40 allows heat generated by the electronic devices included with MCM 16, for example, to be transferred more efficiently to wall 38 so that the heat may be dissipated. Thus, base 10 may function as a heatsink for the dimmable ballast circuit. It should be noted that depending on the final temperatures of the components of the ballast and other factors, such as the requirements of the final application and the lifetime of the components, the use of thermal epoxy 40 may be avoided.

Also, wall 38 functions as an electrical connector for connecting the electronic ballast circuit to one pole of the power line. Specifically, in the preferred embodiment of the present invention, the electronic ballast circuit is connected to the neutral pole via first electrical wire 42. Furthermore, the electronic ballast circuit is electrically connectable to the live pole via a second wire 44, which is electrically connected to connector 46. Connector 46 is electrically insulated from wall 38 by insulation ring 48. Together, insulation ring 48 and connector 46 form closed end 36 of base 10.

Also, as shown by FIG. 5, terminals 32 extend out of thermal epoxy 40 and are electrically connected to respective filaments 50 of fluorescent lamp 12. When the CFLP also includes a feedback device, such as sensor 11, control line or lines 52 will also extend out of epoxy 40 for connection to the device to provide a closed loop control in conjunction with the dimmable ballast circuit.

Figure 6:
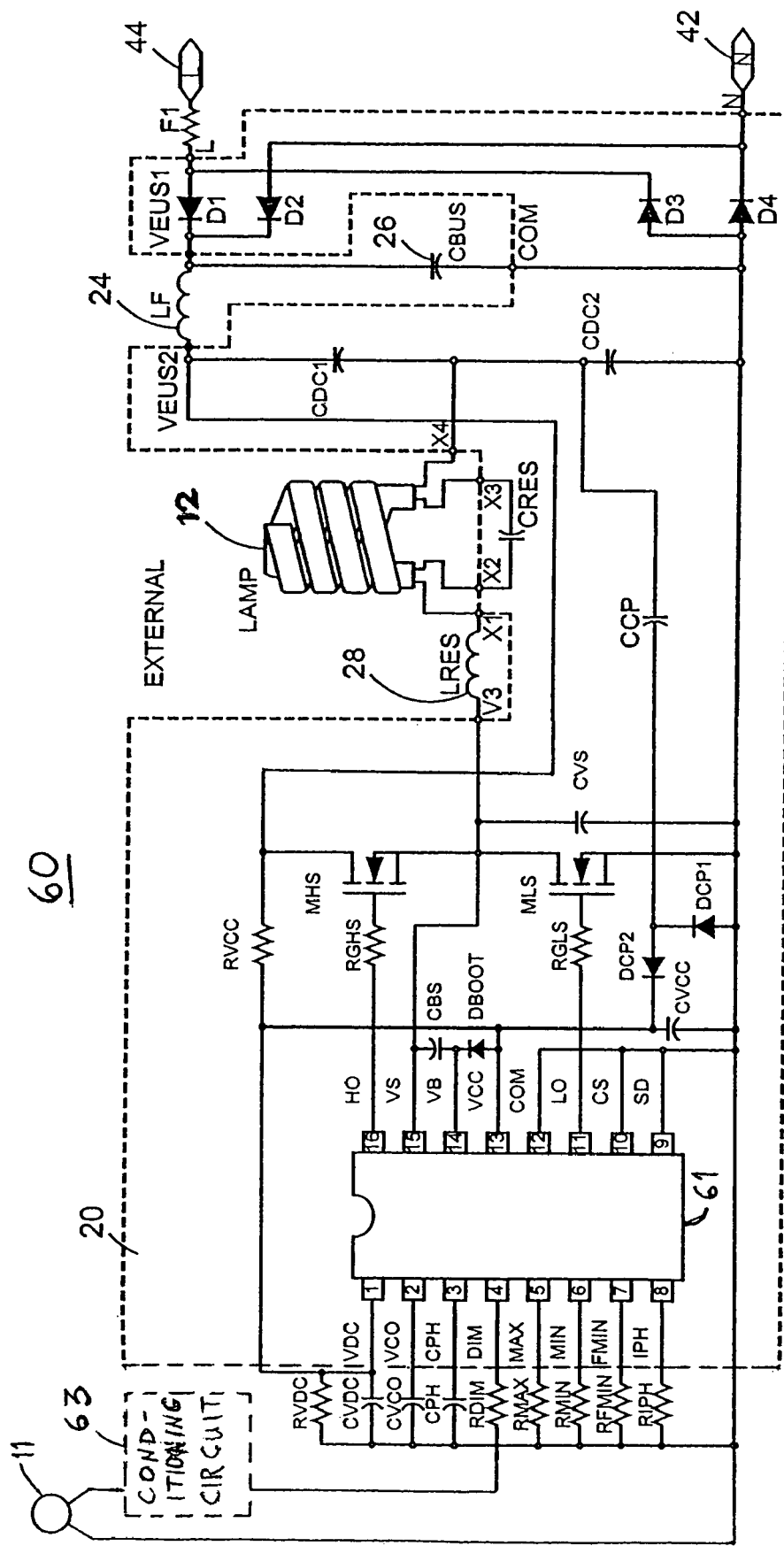
FIG. 6 shows an example dimmable ballast circuit diagram incorporated in a multi-chip module that is used in an embodiment of the present invention.

Referring now to FIG. 6, there is shown a circuit diagram of an example dimmable electronic ballast in accordance with the present invention, the electronic ballast being illustrated generally as ballast 60. As another example, the dimmable electronic ballast in accordance with the present invention can also be implemented using the integrated circuit described in co-pending U.S. patent application Ser. No. 11/063,404, filed Feb. 22, 2005, entitled "BALLAST DIMMING CONTROL IC" by Thomas J. Ribarich, the contents of which are hereby incorporated by reference. Ballast 60 is more fully described below as one example of the dimmable electronic ballast circuit of the present invention.

Ballast 60 can be implemented as example MCM 16 with various components on either side of circuit board 18. In accordance with one aspect of the present invention, a number of components of ballast 60 may be user selectable, while others may be supplied as standard operating elements 20 as indicated by the dashed line in FIG. 6. While FIG. 6 illustrates one potential configuration for user selectable/standard configuration components, it should be apparent that any number of components may be supplied as a standard configuration, depending on the application, or that a variety of components may be provided as user selectable that are not necessarily indicated as such in FIG. 6. For example, resistor RFMIN can be incorporated into the standard configuration, even though it is illustrated as being user selectable in FIG. 6.

Ballast 60 is controlled through a control IC 61 that provides signals to switch switches MHS and MLS in a half-bridge configuration to supply appropriately switched power to lamp 12. IC 61 may be, for example, an integrated circuit sold by the assignee of the present invention under the designation IR2159. Components and values supplied to control IC 61 provide the operating parametrics for control IC 61, including an oscillator frequency limit through capacitor CVCO, a pre-heat frequency through capacitors CPH, and a pre-heat current through resistor RIPH. Control IC 61 also provides a dimming function with a range of dimming defined by resistors RMIN and RMAX. The dimming control provided to the DIM input on pin 4 of control IC 61 determines a lighting level for lamp 12. Input DIM typically ranges from 0.5 to 5.0 Volts, which range is translated to a lighting range based on the values of resistors RMIN and RMAX.

In accordance with the second embodiment of the present invention as indicated above, a sensor 11 can be used to develop a signal supplied to input DIM of control IC 61. According to this embodiment, a conditioning circuit 63 may optionally be used to condition the signal supplied by sensor 11 to obtain a signal suitable for use with input DIM. Alternately, the circuitry represented by conditioning circuit 63 may be incorporated into control IC 61. However, conditioning circuit 63 may also be supplied by a user for a specific application, or be provided for tolerance adjustments or operating range adjustments for sensor 11. That is, conditioning circuit 63 may be incorporated as part of sensor 11, so that sensor 11 outputs a signal appropriate for use with control IC 61. In addition, conditioning circuit 63 may be used to provide various functionality for sensor 11, including such features as hysteresis, analog to digital conversion, a standby or disable mode, and so forth. It should also be apparent that sensor 11 may take the form of, and be used instead of or in conjunction with other sensory devices, such as photodetectors, motion detectors, or room occupancy detectors. Conditioning circuitry 63 may perform other functions including combinatorial logic or other operations using a limited amount of intelligence to provide a particular signal to input DIM of control IC 61 based on signals shared with one or more sensors 11. Alternately, or in addition, control IC 61 may have multiple sensory inputs for different dimming and control functions.

Control IC 61 may implement a number of control scenarios based on specifics of lamp 12 and other components supplied with the lamp, including pre-heat time and frequency, minimum frequency, normal running frequency, and so forth. In addition, in accordance with the present invention, control IC 61 may provide functionality to compensate input DIM in a dynamic closed loop control system when a sensor 11 is included. For example, a range of sensing sensitivity can be determined by control IC 61 based on a set of characteristics provided by sensor 11. One method for determining compensation when sensor 11 is a photodetector device is to drive lamp 12 to a particular light output level and to measure the signal provided by sensor 11 to obtain a particular sensing range or normalized sense signal. In this way, the closed loop control system can be tuned automatically, or different sensor/lamp combinations may be used in the design without the need to provide specific parametrics for operating the control. Alternately, or in addition, sensor 11 can be measured based on a time of day and light output of lamp 12 to obtain a particular signal setting for input DIM, such as in the case of determining a sensor range or a normalized sensor signal, for example.

The possibility exists to provide control IC 61 with further information related to lighting in the room in which it is placed, such as in the case of multiple self-dimming lamps in the same room. One or more self-dimming lamps in accordance with the present invention may be used to determine a light level from another lamp or self-dimming lamp, and adjust individual or a group levels accordingly.

Through sensor 11, control IC 61 may also provide a number of control options for implementing a particular lighting design. For example, control IC 61 may maintain a constant ambient light or constant power to lamp 12, based on the signal provided by sensor 11. In maintaining a light output level, control IC 61 may provide a measure of hysteresis to obtain an acceptable light level range that has the potential to conserve energy and/or compensate for natural light variations that may occur in a give environment. Control IC 61 may also have a particular lighting profile for control of lamp 12, where lamp 12 is set to a maximum output during evening hours, and a dynamic output based on sensor 11, as light levels increase near dawn, or decrease near dusk. Such a program response may be useful for security purposes, for example, or emergency lighting or other nighttime applications. It should be apparent that a range of operation may be provided during daytime hours as light levels change in a particular environment, such as a room with an eastward facing window that preferably has a greater artificial illumination in the afternoon than in the morning. Alternately, control IC 61 may cause lamp 12 to follow a profile of greater output during daylight hours and a decreased output during evening hours, such as may be useful in a power conservation program. It should be apparent that any desirable profile may be programmed into control IC 61.

The dimming operation of control IC 61 is controlled through a voltage controlled oscillator (VCO), the parameters of which are set by external connections including capacitor CVCO. As the voltage applied to input VCO of control IC 61 varies, the switching frequency of the switching half bridge, including switches MHS and MLS similarly varies. Control IC 61 may also incorporate some of the features provided by a dimming ballast control described in U.S. Patent Publication No. 2004/0012346, published Jan. 22, 2004, entitled "BASIC HALOGEN CONVERTER IC" by Peter Green and Iulia Rusu, the entire disclosure of which is hereby incorporated by reference.

As described above, the components within the dashed line of example ballast 60 may be provided as design independent electronic components 20, which would preferably be disposed on one surface of circuit board 18 in MCM 16, for example. The components outside the dashed line may be provided as design dependent electronic components 22 and include components such as, for example, bus capacitor 26 (CBUS), filter inductor 24 (LF), or resonant inductor 28 (LRES), and certain other components that can be changed to correspond to the requirements of fluorescent lamp 12, e.g., resistors RFMIN or RIPH. With the particular ballast circuit shown in FIG. 6, design dependent electronic components 22 that are selected to meet the particular parameters of the ballast include resistor RIPH, which is selected to set the preheat current, capacitor CVCO, which is selected to obtain the oscillator parameters, and inductor 28 (LRES), which is selected to correspond to the lamp power. A fuse F1 may also be provided for protection.

According to a preferred method, when the dimmable electronic ballast circuit 60 is implemented as MCM 16, for example, the passive components of the design independent electronic components 20 are mounted to circuit board 18 using standard pick-and-place surface mount technology. The silicon components (e.g. ICI, MHS, MLS, the diodes) are mounted using chip-on-board multi-chip module technology, which includes mounting the silicon components onto circuit board 18 with epoxy or solder and then making the electrical connections with wirebonds from the pads located on the silicon component to the receiving pads on the circuit board 18.

It should be noted that circuit board 18 of example MCM 16 is preferably circular. Such shape, however, is not critical. Other shapes such as, for example, rectangular shapes can be employed without departing from the scope of the present invention. Furthermore, the body of circuit board 18 may be formed from a polymer, although other suitable materials may be used without deviating from the present invention.

According to an aspect of the invention, MCM 16 according to the preferred method of the present invention may be manufactured by first installing design independent circuit elements 20 and covering the same with plastic molding 51 in a first stage of production. In this stage, a general-purpose motherboard is formed.

Next, design dependent circuit elements 22 are installed in a second stage of production. The second stage of production can take place at a ballast manufacturer's site where design dependent circuit elements 22 that are selected for each particular design can be installed. Thus, a general-purpose type module is manufactured in the first stage of the manufacturing of MCM 16 and then a customized or application specific ballast can be manufactured in the second stage by installing design dependent circuit elements.

According to an aspect of the present invention, once design dependent circuit elements 22 are disposed on the top side of circuit board 18, the entire structure is passed through a solder bath to electrically connect and mechanically secure the design dependent circuit elements 22 to circuit board 18. Thus, the second stage would only require a single step for connecting the design dependent electronic components 22 to the other components in the ballast circuit. It is to be noted a solder bath is possible because design independent elements are covered with plastic molding 50.

Manufacturing MCM 16 in a first stage and second stage as described herein alleviates the need to employ a pick-and-place technique for installing the design dependent circuit elements 22, thus making MCM 16 very attractive to production sites where hand-insertion techniques are practiced in that no additional investment is required by the manufacturer for purchasing costly surface mount pick-and-place equipment.

In another embodiment, only silicon components may be attached, wire-bonded (if required) and covered with plastic molding 51 in the first stage, and the remaining surface mounted components may be installed to form MCM 16 in the second stage. Such an embodiment provides flexibility for those manufacturer's who enjoy surface mounting capability and prefer to acquire their own surface mounted components. Very high volume productions may adopt this alternative embodiment for more economical results.

Once MCM 16 is formed, it is inserted into the interior of base 10. Base 10 may be an ordinary Edison screw-base or any other conventional base, screw type or otherwise, which is used for a conventional incandescent light bulb. Wires 42, 44 are then connected as described above, and the interior of base 10 is then potted with thermal epoxy 40, for example, so that the heat generated by the components in MCM 16 can escape through base 10. MCM 16 is then connected to fluorescent lamp 12 and sensor 11, when included, either before or after insertion of MCM 16 into base 10. Diffuser 14 may be attached to base 10 before or preferably after MCM 16 is installed in base 10 with sensor 11 preferably mounted on diffuser 14. Thus, diffuser 14 and fluorescent lamp 12 are attached directly to base 10 eliminating the need for an auxiliary section as required in prior art dimmable CFLPs. Nonetheless, it should again be noted that according to the present invention, diffuser 14 and fluorescent lamp 12 do not need to be directly attached to base 10.

In an alternative embodiment a small plastic collar may be inserted between base 10 and diffuser 14 to ease joining, for example, glass to metal, and also when diffuser 14 has a wider mouth than the diameter of base 10 in order to receive fluorescent lamp 12. Alternatively, a small collar can be used to hold fluorescent lamp 12 and diffuser 14 and act as the interface for joining fluorescent lamp 12 and diffuser 14 to base 10. The final technique used will depend on the preference at the final manufacturing site.

In an alternative embodiment, diffuser 14 may be omitted if the height of fluorescent lamp 12 is low enough so that it does not protrude outside a fixture as prior art CFLPs. In such an embodiment, if a sensor 11 is included, it may be mounted on base 10 such that the sensor clears a socket in which CFLP 9 is inserted. Alternately sensor 11 may be mounted on lamp 12.

In an additional embodiment, diffuser 14 may be in two pieces separable at a point along its body to allow for the insertion of larger fluorescent lamps or a fluorescent lamp with a unique geometry. That is, diffuser 14 may have an open top allowing for the insertion of fluorescent lamp 12 from the top.

It should be noted that example MCM 16 is not limited to the form disclosed herein, but may be implemented using other forms. For example, MCM 16 may be implemented using two cooperatively connected circuit boards, such as, a motherboard/daughterboard arrangement. Also, MCM 16 may be arranged inside base 10 in any manner, for example, vertical sideways, horizontal bottom down, and horizontal bottom up.

Figure 7:
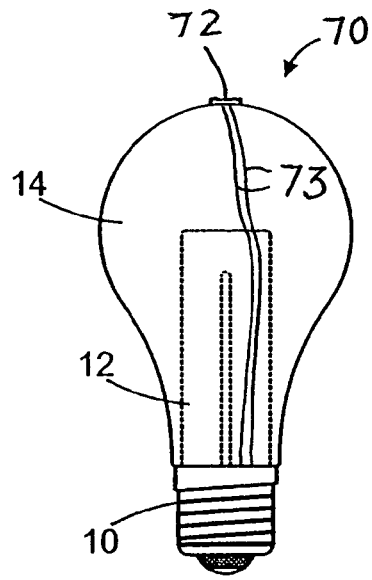
FIG. 7 is an illustration of an example self-dimming compact fluorescent lamp in accordance with an embodiment of the present invention.
Figure 8:
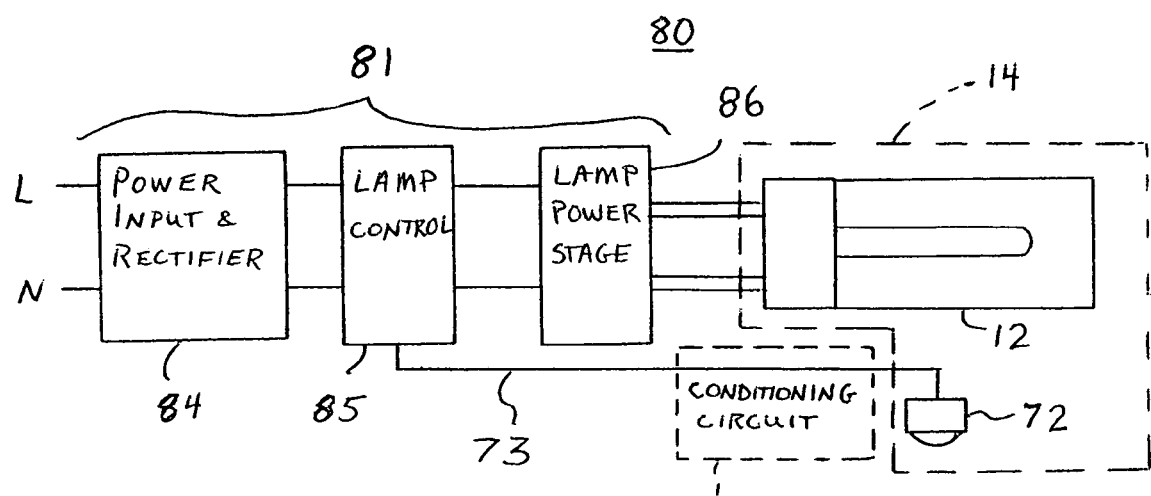
FIG. 8 is a block diagram illustrating an example control according to the present invention.

Referring now to FIGS. 7 and 8, in accordance with the second embodiment of the present invention, an example self-dimming lamp 70 is illustrated. Self-dimming lamp 70 is substantially similar to CFLP 9 illustrated in FIG. 3, with like components indicated with like reference designators, the description of which is referred to above.

Self-dimming lamp 70 includes a photodetector 72 as sensor 11 (FIG. 3) positioned on diffuser 14 with connection wires 73 connecting photodetector 72 to an dimmable electronic ballast 81 located substantially or entirely in base 10. Electronic ballast 81 can be similar to that illustrated in FIG. 6, for example, but may include any type of lamp control 85, including control IC 61, and may have additional inputs or facility for handling the dimming control provided by photodetector 72. Photodetector 72 is oriented to detect ambient light in an area surrounding lamp 70, with little or no direct impact from the output of fluorescent lamp 12. Alternately, or in addition, photodetector 72 may detect light output directly from fluorescent lamp 12, or other photodetectors may be provided to detect ambient light and indirect light from fluorescent lamp 12 as well as light directly emitted from fluorescent lamp 12. For example, a lighting application may call for a variety of types of light, where it is desirable to detect light emitted from lamp 70 as well as light from other light sources, which may be of a different character than that emitted from lamp 70. It may also be desirable to provide a plurality of photodetectors 72 to establish an ambient light operating range as well as a range for light provided by lamp 70 that is handled by the dimmable electronic ballast in base 10. For example, several photodetectors 72 having different but overlapping ranges may be used to increase a light sensing sensitivity of lamp 70.

Lamp control 85 includes, for example, control IC 61 illustrated in FIG. 6, which may be replaced or substituted with other ballast control ICs that have a dimming feature to which wires 73 may be connected. In such a case, the signal carried by wires 73 from photodetector 72 provides the dimming control signal for contributing to operating electronic ballast 81 to determine programmed light levels output by lamp 70. Wires 73 may be incorporated into diffuser 14, for example, and may include multiple wires to provide a variety of functions from photodetector 72, in conjunction with other sensor devices, for example. Wires 73 may also be provided to obtain a sensory parametric value, such as a range or offset for using the signal provided by photodetector 72. As discussed above, sensor 11 may be provided as a motion detector sensor, room occupancy sensor, or ambient light detector, as well as a direct light sensor that is capable of directing sensing light from fluorescent lamp 12.

As shown in FIG. 8, a block diagram illustrating an example self-dimming CFLP 80 in accordance with the second embodiment of the present invention is shown. Electronic ballast 81 provides the power conditioning and lamp control for controlling lamp 12 to provide a desired light or power output. A power input stage 84 receives input line power and conditions the input line power to provide DC power. Lamp control block 85 receives various inputs including power from input stage 84 and feedback signals from photodetector 72, for example. A number of other parameters may be provided to lamp control 85, as described above. For example, conditioning circuit 88 is optionally provided to condition the signal supplied by photodetector 72, or to provide additional functionality for other sensors 11 or sensing functions. Circuit 88 may optionally be incorporated into either photodetector 72 or lamp control 85 to permit a variety of sensors 11 to be used with CFLP 80.

Lamp control 85 provides control signals to lamp power stage 86, which regulates the power supplied to lamp 12 according to the control directed by lamp control 85. In accordance with the present invention, lamp control 85 may be used with a number of lamps, where the number of lamps are driven by a single ballast with input contributed from a sensor such as photodetector 72. Alternately, or in addition, one or more lamps may be driven with input contributions from a number of sensors that provide various input signals to lamp control 85 to obtain a particular lighting control.

Although the present invention has been described in relation to particular embodiments thereof, many other variations and modifications and other uses will become apparent to those skilled in the art. Therefore, the present invention should be limited not by the specific disclosure herein, but only by the appended claims.

I claim:

1. A compact fluorescent lamp package, comprising:
   a lamp base intended to be inserted into an electrical socket and for electrically connecting the lamp package to the electrical socket, the base including an open end and a closed end and a wall surrounding the closed end to provide an enclosure around a space;
   a complete dimmable ballast circuit within the space in the base and electrically connected to the base to receive power from the electrical socket;
   a fluorescent lamp extending away from the base and operatively connected to the dimmable ballast circuit;
   a diffuser disposed around the fluorescent lamp and directly connected to the lamp base; and
   a sensor disposed on the diffuser and operatively coupled to the ballast circuit to provide the ballast circuit with signals for the automatic variation in the change of a state of operation of the fluorescent lamp in response to an environmental condition outside the fluorescent lamp package.

2. The compact fluorescent lamp package of claim 1, wherein the complete dimmable ballast circuit is implemented as a multi-chip module.

3. The compact fluorescent lamp package of claim 1, wherein the lamp base is a screw-base.

4. The compact fluorescent lamp package of claim 3, wherein the lamp base is an Edison screw-base.

5. The compact fluorescent lamp package of claim 1, further comprising a thermally conductive body disposed within the lamp base and thermally connecting the lamp base to the dimmable ballast circuit, whereby the lamp base may dissipate heat generated by the dimmable ballast circuit.

6. A compact fluorescent lamp package of claim 5, wherein said thermally conductive body is a thermal epoxy which is disposed in the space in the base for mechanical stability and thermal management.

7. A compact fluorescent lamp package of claim 1, wherein the environmental condition relates to state of ambient light outside said fluorescent lamp.

8. A compact fluorescent lamp package of claim 1, wherein the environmental condition relates to motion outside said fluorescent lamp.

9. A compact fluorescent lamp package of claim 1, wherein the state of operation relates to level of light output of the fluorescent lamp.

10. A compact fluorescent lamp package of claim 1, wherein the signals serve to dim the fluorescent lamp.

11. A compact fluorescent lamp package of claim 1, wherein the signals turn the fluorescent lamp on in response to motion outside the fluorescent lamp.

* * * * *